(12) United States Patent
Fujishita

(10) Patent No.: US 8,345,284 B2
(45) Date of Patent: Jan. 1, 2013

(54) INFORMATION PROCESSING SYSTEM, INFORMATION PROCESSING DEVICE, AND COMPUTER-READABLE RECORD MEDIUM STORING INFORMATION PROCESSING PROGRAM

(75) Inventor: Masahiro Fujishita, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 1025 days.

(21) Appl. No.: 12/271,431

(22) Filed: Nov. 14, 2008

(65) Prior Publication Data

US 2009/0128852 A1  May 21, 2009

(30) Foreign Application Priority Data

Nov. 15, 2007  (JP) ................................. 2007-296614

(51) Int. Cl.
 *G06F 3/12* (2006.01)
 *G06K 15/00* (2006.01)
 *G06F 3/00* (2006.01)
 *G06F 15/00* (2006.01)

(52) U.S. Cl. ...... 358/1.15; 358/1.14; 709/203; 709/207; 726/28

(58) Field of Classification Search ........................ None
See application file for complete search history.

(56) References Cited

U.S. PATENT DOCUMENTS

| | | | |
|---|---|---|---|
| 6,654,779 B1 * | 11/2003 | Tsuei | 718/101 |
| 7,162,514 B2 | 1/2007 | Hirai | |
| 7,260,637 B2 | 8/2007 | Kato | |
| 7,437,467 B2 | 10/2008 | Kato | |
| 7,647,395 B2 * | 1/2010 | Sando | 709/223 |
| 2002/0049837 A1 * | 4/2002 | Kato | 709/223 |
| 2003/0084110 A1 * | 5/2003 | Shono | 709/206 |
| 2004/0190052 A1 * | 9/2004 | Sando | 358/1.15 |
| 2005/0088681 A1 * | 4/2005 | Hosoda | 358/1.14 |
| 2006/0095500 A1 | 5/2006 | Kato | |
| 2006/0192999 A1 | 8/2006 | Kawai | |

(Continued)

FOREIGN PATENT DOCUMENTS

JP  HEI 11-041406  2/1999

(Continued)

OTHER PUBLICATIONS

Japanese Official Action dated Aug. 18, 2009 together with English translation.

(Continued)

*Primary Examiner* — Satwant Singh
(74) *Attorney, Agent, or Firm* — Scully, Scott, Murphy & Presser, PC

(57) ABSTRACT

An information processing system comprises a device with which network settings are associated, information processing devices connected to the device via a network, a registration unit in which identification information (specifying each information processing device storing the network settings of the device and controlling it using the network settings) is registered, a change information generating unit which generates change information (for incorporating a change in the network settings associated with the device into the network settings stored in each information processing device) upon a change in the network settings associated with the device, a first transmission unit which transmits the change information to each information processing device specified by the identification information registered in the registration unit, and an addition unit which additionally registers identification information specifying an information processing device in the registration unit upon installation of an application regarding control of the device in the information processing device.

14 Claims, 13 Drawing Sheets

U.S. PATENT DOCUMENTS

| | | | |
|---|---|---|---|
| 2007/0214508 A1* | 9/2007 | Fukui et al. | 726/28 |
| 2008/0133680 A1* | 6/2008 | Kodama | 709/206 |
| 2008/0200118 A1* | 8/2008 | Kubo et al. | 455/14 |
| 2010/0238515 A1* | 9/2010 | Kanuma | 358/444 |
| 2011/0004666 A1* | 1/2011 | Kodama | 709/206 |

FOREIGN PATENT DOCUMENTS

| | | |
|---|---|---|
| JP | HEI 11-314439 | 11/1999 |
| JP | 2001-338208 | 12/2001 |
| JP | 2002-123380 | 4/2002 |
| JP | 2002-202871 | 7/2002 |
| JP | 2002-307760 | 10/2002 |
| JP | 2003-108481 | 4/2003 |
| JP | 2003-108482 | 4/2003 |
| JP | 2003-141041 | 5/2003 |
| JP | 2004-74458 | 3/2004 |
| JP | 2004-192234 | 7/2004 |
| JP | 2004-280212 | 10/2004 |
| JP | 2004-280218 | 10/2004 |
| JP | 2006-39602 | 2/2006 |
| JP | 2006-113953 | 4/2006 |
| JP | 2006-236062 | 9/2006 |
| JP | 2006-294025 | 10/2006 |
| JP | 2007-55124 | 3/2007 |
| JP | 2007-118614 | 5/2007 |
| JP | 2007-148858 | 6/2007 |

OTHER PUBLICATIONS

Notification of Reasons for Rejection dated Nov. 29, 2011 received from the Japanese Patent Office from related Japanese Application No. 2010-099204, together with an English-language translation.

* cited by examiner

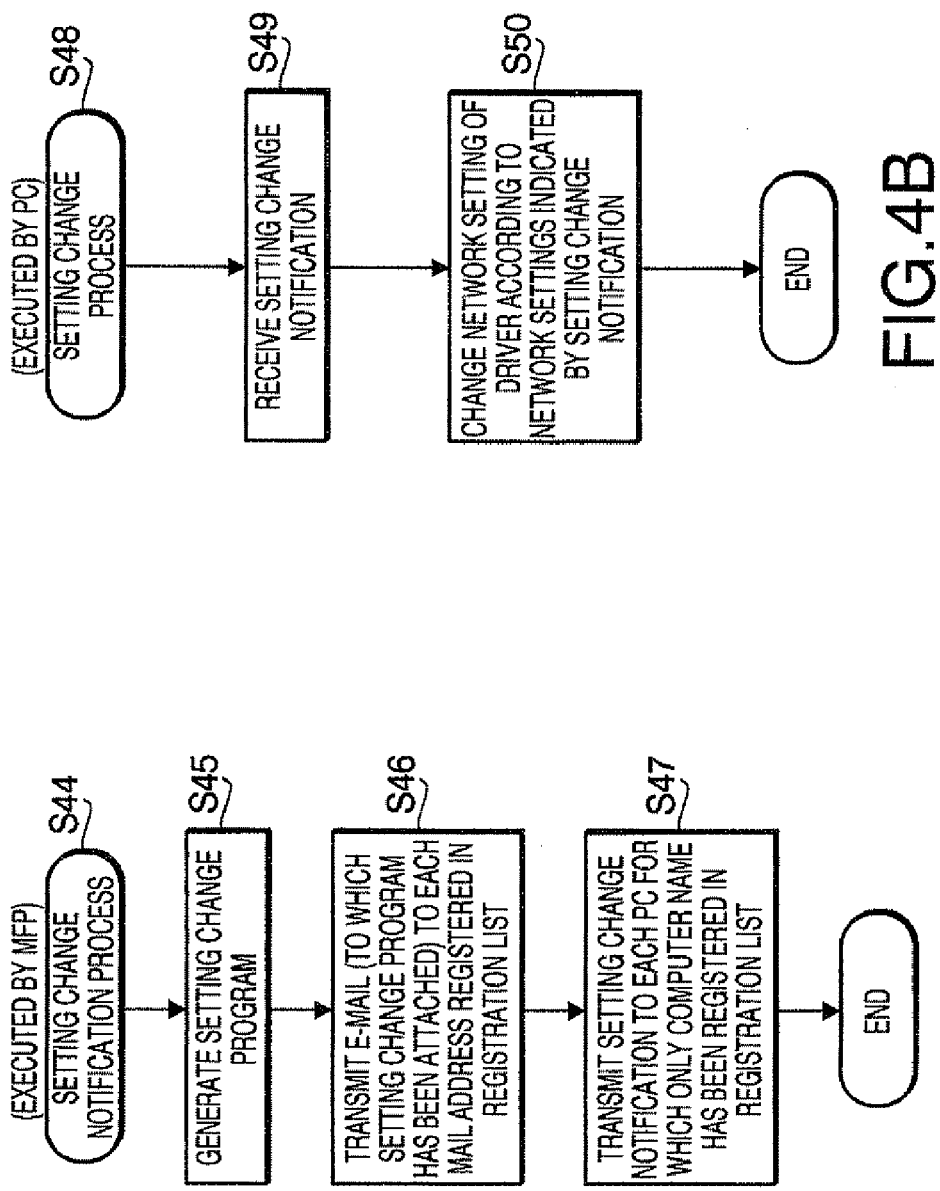

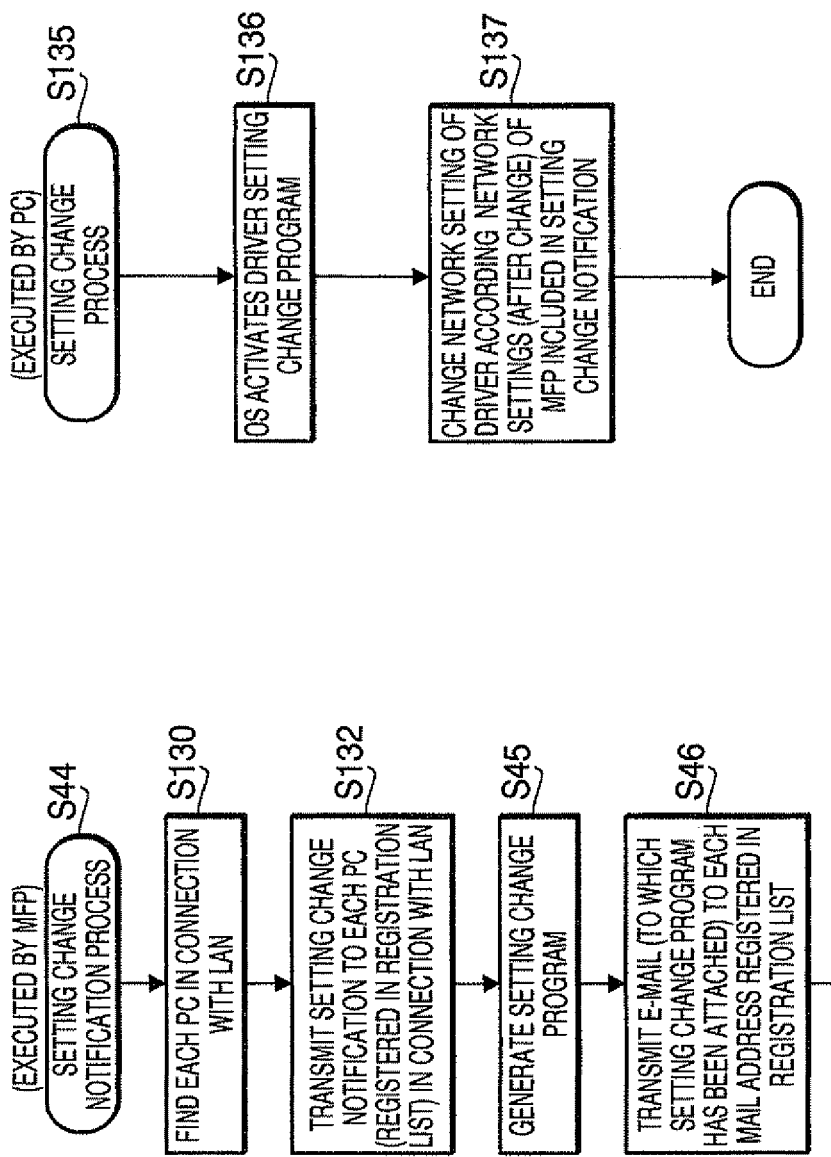

INFORMATION PROCESSING SYSTEM, INFORMATION PROCESSING DEVICE, AND COMPUTER-READABLE RECORD MEDIUM STORING INFORMATION PROCESSING PROGRAM

CROSS-REFERENCE TO RELATED APPLICATION

This application claims priority under 35 U.S.C. §119 from Japanese Patent Application No. 2007-296614 filed on Nov. 15, 2007. The entire subject matter of the application is incorporated herein by reference.

BACKGROUND

1. Technical Field

The present invention relates to an information processing system, an information processing device and a computer-readable record medium storing an information processing program.

2. Prior Art

There have been used communication systems in which multiple client terminals are connected to a network printer via a network so that the network printer can be controlled from the client terminals.

In such a communication system, it is necessary to install the driver of the network printer in each of the client terminals in order to let each client terminal use the network printer. In the driver installation, various network settings (e.g. IP address of the network printer) are manually inputted to each client terminal. In other words, the network settings of the network printer are stored in each of the client terminals.

Thus, when it is necessary during the use of the communication system to change the IP address of the network printer for some reason, the user has to change not only the IP address setting stored in the network printer but also the network settings regarding the network printer stored in each of the client terminals. Since such tasks (changing the IP address, etc.) have to be carried out manually by a network administrator, for example, the workload on the network administrator, etc. multiplies as the number of the client terminals increases.

Meanwhile, in a system disclosed in Japanese Patent Provisional Publication No. 2004-280212 (hereinafter referred to as a "patent document #1"), the e-mail address of each client terminal is previously registered in a network printer and setting information regarding the print protocol is transmitted from the network printer to each of the client terminals by e-mail.

However, even in the system of the patent document #1, the registration of the e-mail address in the network printer is necessary in regard to all the client terminals (e.g. client PCs) connected to the network printer via a network, which becomes extremely troublesome to the user (e.g. network administrator) as the number of the client terminals increases.

SUMMARY OF THE INVENTION

The present invention, which has been made in consideration of the above problems, is advantageous in that an information processing system, an information processing device and a computer-readable record medium (storing an information processing program), capable of reducing the operating load on the network administrator or user for changing network settings, can be provided.

In accordance with an aspect of the present invention, there is provided an information processing system comprising a device with which one or more network settings are associated, one or more information processing devices connected to the device via a network, a registration unit in which identification information (specifying each of the information processing devices that stores the network settings of the device and controls the device by use of the stored network settings) is registered, a change information generating unit which generates change information (to be used for incorporating a change in the network settings associated with the device into the network settings stored in each information processing device) upon a change in the network settings associated with the device, a first transmission unit which transmits the change information generated by the change information generating unit to each information processing device specified by the identification information registered in the registration unit, and an addition unit which additionally registers identification information specifying an information processing device in the registration unit upon installation of an application regarding control of the device in the information processing device.

In the information processing system configured as above, upon a change in the network settings of the device, the change information to be used for incorporating the change into the network settings stored in each information processing device is generated and transmitted to each information processing device specified by the identification information registered in the registration unit. Thus, on the information processing device's side receiving the change information, it is possible to follow the change in the network settings of the device (i.e. change the network settings stored in the information processing device accordingly) by use of the change information. Further, upon installation of an application regarding the control of the device in an information processing device, the identification information specifying the information processing device is additionally registered in the registration unit. In other words, the additional registration of the identification information (specifying an information processing device) in the registration unit is automatically conducted in regard to each information processing device into which changes in the network settings of the device have to be incorporated. Thus, the operating load on the network administrator or user can be reduced considerably compared to cases where the administrator or user has to manually register the identification information regarding each information processing device capable of controlling the device.

Here, the "network settings" associated with the device are settings to be used for communication with the device. The "network settings" can include the IP address, node name or URL (Uniform Resource Locator) assigned to the device, for example. The MAC (Media Access Control) address of the device can also be included in the "network settings". Since the MAC address assigned to the device is changed when a network interface of the device is replaced, the present invention is applicable to such network settings including the MAC address.

The "network settings" can also include an encryption key to be used for encrypting data communication between the device and each information processing device.

The "identification information" (specifying an information processing device) registered in the registration unit may include an e-mail address of the information processing device, a computer name assigned to the information processing device, etc.

Incidentally, while the change information generating unit and the first transmission unit of the information processing system can generally be provided in the device, the units may also be provided in an information processing device.

In the information processing system, the information processing device may be equipped with an e-mail address acquisition unit which acquires an e-mail address which has been set to the information processing device when an application for controlling the device should be installed in the information processing device, an e-mail address notification unit which sends the e-mail address acquired by the e-mail address acquisition unit to a device equipped with the registration unit in order to register the e-mail address in the registration unit, and an installation unit which installs the application in the information processing device upon the acquisition of the e-mail address by the e-mail address acquisition unit. With this configuration, the installation of an application for controlling the device is automatically executed in an information processing device whose e-mail address is registered in the registration unit, by which the network administrator or user is relieved of being required to judge whether or not to install the application in the information processing device.

In accordance with another aspect of the present invention, there is provided an information processing system comprising a device with which one or more network settings are associated, one or more information processing devices connected to the device via a network, a registration unit in which identification information (specifying each of the information processing devices that stores the network settings of the device and controls the device by use of the stored network settings) is registered, a change information generating unit which generates change information (to be used for incorporating a change in the network settings associated with the device into the network settings stored in each information processing device) upon a change in the network settings associated with the device, a storage unit which stores the change information generated by the change information generating unit, a second transmission unit which transmits access information (to be used for accessing the change information stored in the storage unit) to each information processing device specified by the identification information registered in the registration unit, and an addition unit which additionally registers identification information specifying an information processing device in the registration unit upon installation of an application regarding control of the device in the information processing device.

In the information processing system configured as above, upon a change in the network settings of the device, the change information to be used for incorporating the change into the network settings stored in each information processing device is generated and stored in the storage unit, and the access information to be used for accessing the change information stored in the storage unit is transmitted to each information processing device specified by the identification information registered in the registration unit. Thus, on the information processing device's side receiving the access information, it is possible to access the change information by use of the access information and follow the change in the network settings of the device (i.e. change the network settings stored in the information processing device accordingly) by use of the change information. Further, upon installation of an application regarding the control of the device in an information processing device, the identification information specifying the information processing device is additionally registered in the registration unit. In other words, the additional registration of the identification information (specifying an information processing device) in the registration unit is automatically conducted in regard to each information processing device into which changes in the network settings of the device have to be incorporated. Thus, the operating load on the network administrator or user can be reduced considerably compared to cases where the administrator or user has to manually register the identification information regarding each information processing device capable of controlling the device.

In accordance with another aspect of the present invention, there is provided a computer-readable record medium storing computer-readable instructions that cause an information processing device, which is connected via a network to an information processing system (including a device with which one or more network settings are associated, one or more information processing devices connected to the device via the network, a registration unit in which identification information specifying each of the information processing devices that stores the network settings of the device and controls the device by use of the stored network settings is registered, a change information generating unit which generates change information to be used for incorporating a change in the network settings associated with the device into the network settings stored in each information processing device upon a change in the network settings associated with the device, and a first transmission unit which transmits the change information generated by the change information generating unit to each information processing device specified by the identification information registered in the registration unit), to execute an addition requesting step of requesting additional registration of identification information specifying the information processing device in the registration unit upon installation of an application regarding control of the device in the information processing device.

By making the information processing device operate according to the computer-readable instructions acquired (loaded, installed, etc.) from the computer-readable record medium, effects similar to those of the aforementioned information processing system can be achieved.

In accordance with another aspect of the present invention, there is provided a computer-readable record medium storing computer-readable instructions that cause an information processing device, which is connected via a network to an information processing system (including a device with which one or more network settings are associated, one or more information processing devices connected to the device via the network, a registration unit in which identification information specifying each of the information processing devices that stores the network settings of the device and controls the device by use of the stored network settings is registered, a change information generating unit which generates change information to be used for incorporating a change in the network settings associated with the device into the network settings stored in each information processing device upon a change in the network settings associated with the device, a storage unit which stores the change information generated by the change information generating unit, and a second transmission unit which transmits access information to be used for accessing the change information stored in the storage unit to each information processing device specified by the identification information registered in the registration unit), to execute an addition requesting step of requesting additional registration of identification information specifying the information processing device in the registration unit upon installation of an application regarding control of the device in the information processing device.

By making the information processing device operate according to the computer-readable instructions acquired (loaded, installed, etc.) from the computer-readable record medium, effects similar to those of the aforementioned information processing system can be achieved.

In accordance with another aspect of the present invention, there is provided an information processing device to be connected via a network to an information processing system including a device with which one or more network settings are associated, one or more information processing devices connected to the device via the network, a registration unit in which identification information specifying each of the information processing devices that stores the network settings of the device and controls the device by use of the stored network settings is registered, a change information generating unit which generates change information to be used for incorporating a change in the network settings associated with the device into the network settings stored in each information processing device upon a change in the network settings associated with the device, and a first transmission unit which transmits the change information generated by the change information generating unit to each information processing device specified by the identification information registered in the registration unit. The information processing device comprises an addition requesting unit which requests additional registration of identification information specifying the information processing device in the registration unit upon installation of an application regarding control of the device in the information processing device.

By connecting the above information processing device to such an information processing system (including the registration unit, change information generating unit and first transmission unit) via a network, effects similar to those of the aforementioned information processing system can be achieved.

In accordance with another aspect of the present invention, there is provided an information processing device to be connected via a network to an information processing system including a device with which one or more network settings are associated, one or more information processing devices connected to the device via the network, a registration unit in which identification information specifying each of the information processing devices that stores the network settings of the device and controls the device by use of the stored network settings is registered, a change information generating unit which generates change information to be used for incorporating a change in the network settings associated with the device into the network settings stored in each information processing device upon a change in the network settings associated with the device, a storage unit which stores the change information generated by the change information generating unit, and a second transmission unit which transmits access information to be used for accessing the change information stored in the storage unit to each information processing device specified by the identification information registered in the registration unit. The information processing device comprises an addition requesting unit which requests additional registration of identification information specifying the information processing device in the registration unit upon installation of an application regarding control of the device in the information processing device.

By connecting the above information processing device to such an information processing system (including the registration unit, change information generating unit, storage unit and second transmission unit) via a network, effects similar to those of the aforementioned information processing system can be achieved.

Other objects, features and advantages of the present invention will become more apparent from the consideration of the following detailed description taken in conjunction with the accompanying drawings.

BRIEF DESCRIPTION OF THE ACCOMPANYING DRAWINGS

FIG. 4A is a flow chart showing a setting change notification process which is executed by the MFP.

FIG. 4B is a flow chart showing a setting change process which is executed by each PC receiving a setting change notification transmitted from the MFP.

FIG. 13A is a flow chart showing a setting change notification process as a second modification.

FIG. 13B is a flow chart showing a setting change process as a third modification.

DETAILED DESCRIPTION OF THE EMBODIMENTS

Figure 1A:
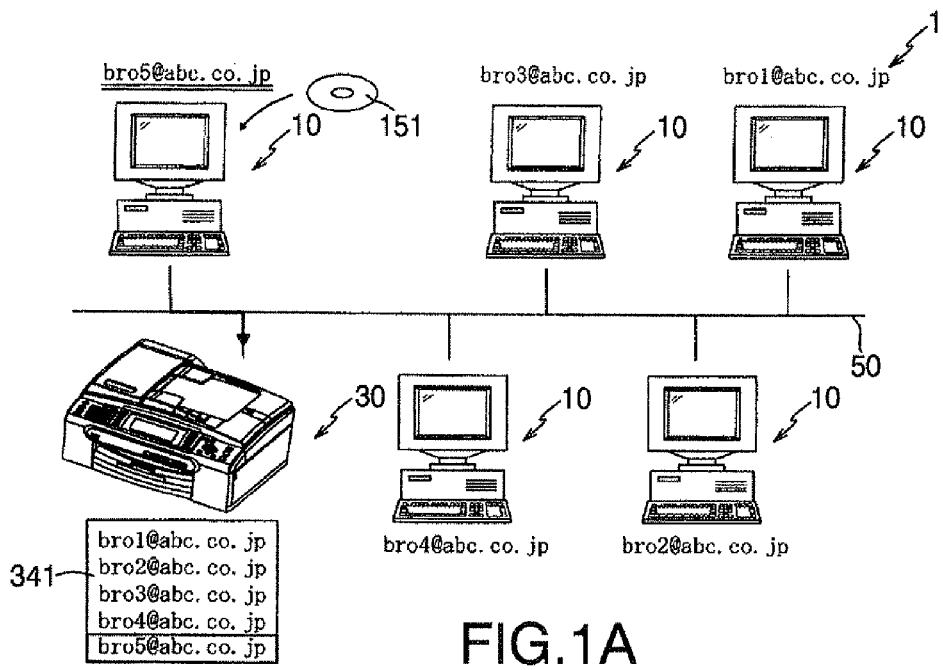
FIG. 1A is a schematic block diagram showing the overall composition of an information processing system in accordance with a first embodiment of the present invention.

Referring now to the drawings, a description will be given in detail of preferred embodiments in accordance with the present invention.

Embodiment 1

FIG. 1A is a schematic block diagram showing the overall composition of an information processing system 1 in accordance with a first embodiment of the present invention. As shown in FIG. 1A, the information processing system 1 of the first embodiment includes a plurality of PCs (Personal Computers) 10 and an MFP (Multi-Function Peripheral) 30 which are connected together by a LAN (Local Area Network) 50.

Especially, the information processing system 1 of this embodiment is configured so that the e-mail address and/or the computer name of a PC 10 are registered in a registration list 341 of the MFP 30 upon installation of a driver for controlling the MFP 30 in the PC 10, by which the operating load on the network administrator or user for changing network settings can be reduced.

In the information processing system 1, each PC 10 has been assigned an e-mail address (hereinafter referred to simply as a "mail address"). Meanwhile, the MFP 30 has been assigned (associated with) network settings (IP address, node name, etc.) to be used for specifying the device. In each PC 10, a driver 142 (see FIG. 2) for controlling the MFP 30 has been installed. The network settings 142a (see FIG. 2) of the MFP 30 have been stored in each PC 10 as the settings of the driver 142. By use of the network settings 142a, each PC 10 can establish communication with the MFP 30 and control the MFP 30. According to the control by each PC 10, the MFP 30 carries out various functions (printing, image scanning, etc.).

In short, the network settings assigned to the MFP 30 are stored not only in the MFP 30 itself but also in each PC 10 in which the driver 142 has been installed. In the following explanation, the network settings of the MFP 30 stored in the MFP 30 itself will be referred to as "network settings of the MFP 30" while those stored in each PC 10 will be referred to as "network settings of the driver 142" to clearly discriminate between them.

FIG. 1A schematically shows a state in which an installer 151 has been inserted into a CD drive of one of the PCs 10 of the information processing system 1. The installer 151 is a CD ROM for the installation of the driver 142 (for the control of the MFP 30) in the PC 10. The following explanation will be given assuming that the driver 142 for the control of the MFP 30 has already been installed in the other four PCs 10.

Upon installation of the driver 142 (for the control of the MFP 30) in the PC 10 from the installer CD 151 inserted into the CD drive of the PC 10 (see FIG. 1A), the PC 10 transmits its own mail address ("bro5@abc.co.jp" in FIG. 1A) and computer name (unshown) to the MFP 30 to make the MFP 30 additionally register the mail address and computer name in its registration list 341. In the registration list 341 shown in FIG. 1A, the mail address "bro5@abc.co.jp" of the PC 10 has just been additionally (newly) registered. Thus, the mail addresses and computer names of PCs 10 (among those connected to the information processing system 1) in which the driver 142 has been installed (i.e. PCs 10 having the possibility of controlling the MFP 30) are stored in the registration list 341 of the MFP 30.

Figure 1B:
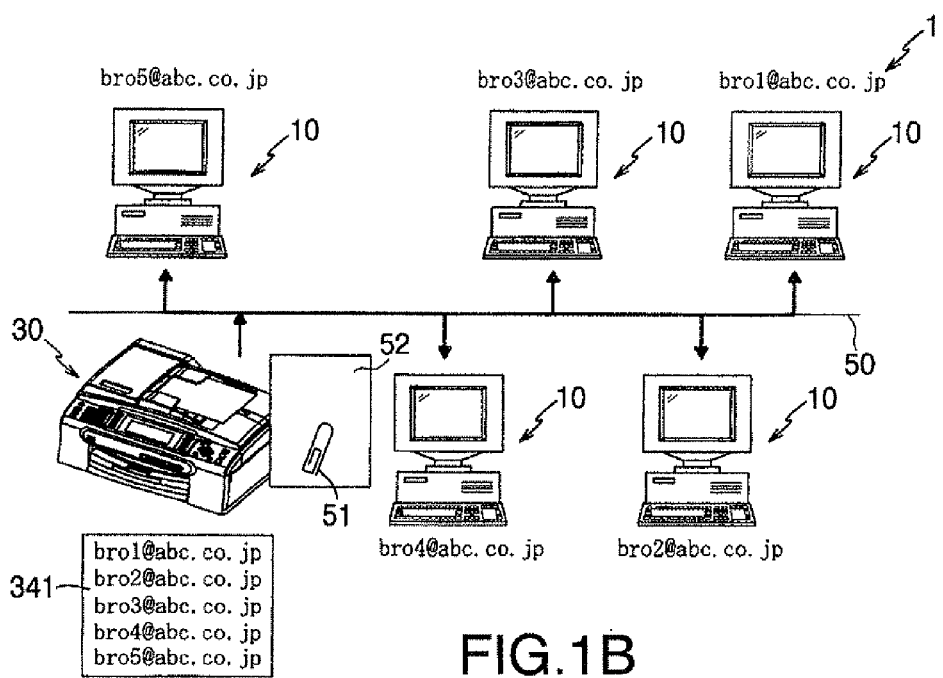
FIG. 1B is a schematic block diagram showing a process flow in a case where network settings assigned to an MFP in the information processing system have been changed after additional registration of an e-mail address (shown in FIG. 1A) in a registration list of the MFP.

Next, a case where the network settings assigned to the MFP 30 have been changed will be described referring to FIG. 1B. FIG. 1B is a schematic block diagram showing a process flow in a case where the network settings assigned to the MFP 30 have been changed after the additional registration of the mail address "bro5@abc.co.jp" (shown in FIG. 1A) in the registration list 341.

Referring to FIG. 1B, upon a change in the network settings assigned thereto, the MFP 30 generates a setting change program 51 (to be used for incorporating the change into the network settings of the driver 142 of each PC 10) and transmits the setting change program 51 to all the mail addresses registered in the registration list 341 by sending an e-mail 52 (with the setting change program 51 as an attachment) to the mail addresses.

As above, in the information processing system 1 of this embodiment, the network administrator or the user of each PC 10 receiving the e-mail 52 is capable of changing the network settings of the driver 142 stored in the PC 10 according to the change in the network settings of the MFP 30, by just running the setting change program 51 (attached to the received e-mail 52) on the PC 10.

Further, in the information processing system 1 of this embodiment, the mail address of a PC 10 is automatically added to (registered in) the registration list 341 of the MFP 30 upon installation of the driver 142 for controlling the MFP 30 in the PC 10, by which the operating load on the network administrator or user is reduced compared to cases where the administrator or user manually registers the mail address and computer name of each of the PCs 10 capable of controlling the MFP 30.

Figure 2:
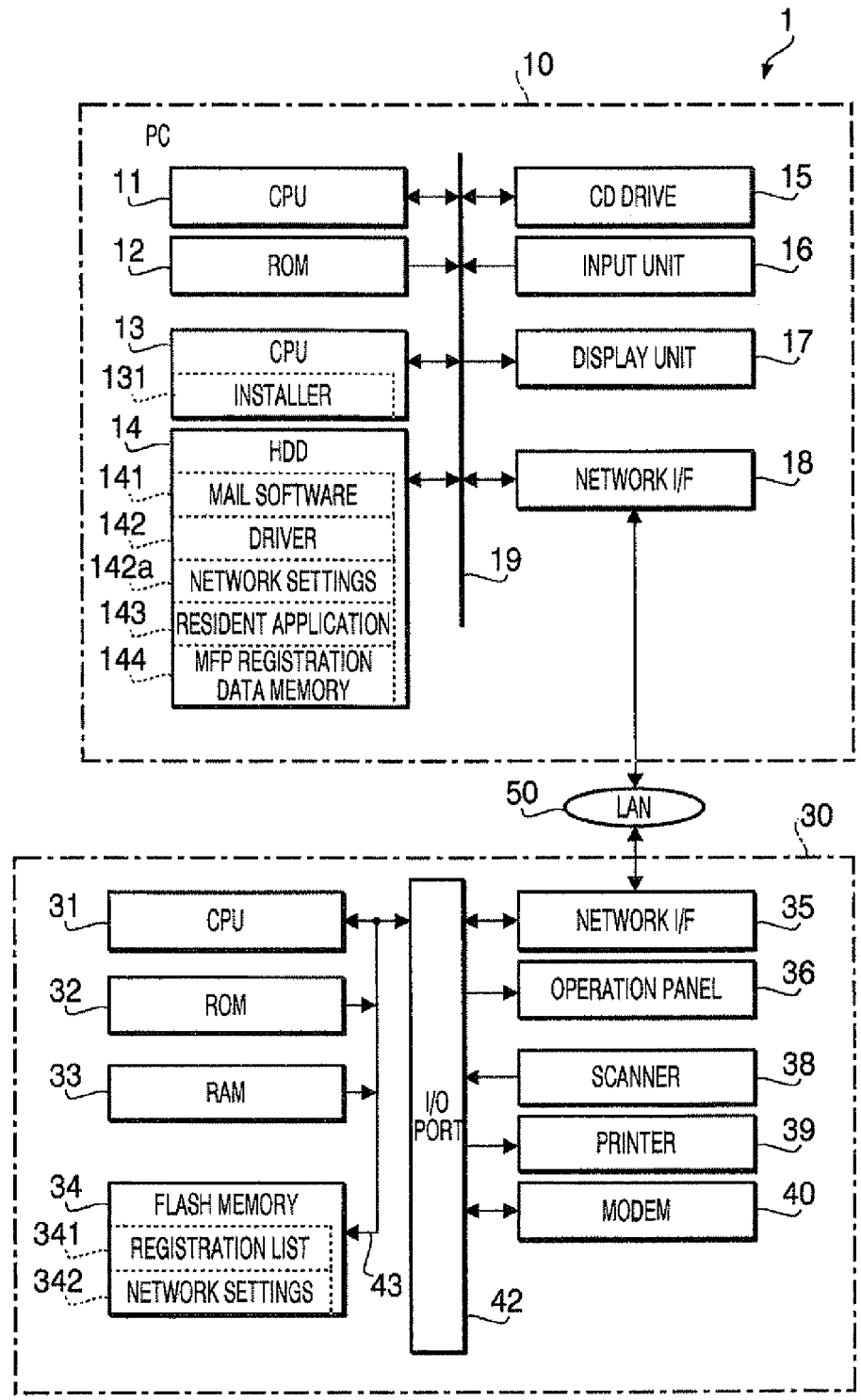
FIG. 2 is a block diagram showing the electrical configuration of the information processing system shown in FIG. 1A.

FIG. 2 is a block diagram showing the electrical configuration of the information processing system 1 shown in FIG. 1A. Incidentally, while all the five PCs 10 connected to the LAN 50 are shown in FIGS. 1A and 1B, only one PC 10 is shown in FIG. 2 (illustration and explanation of the other PCs 10 are omitted) since the characteristic configuration shown in FIG. 2 is common to all the PCs 10.

As shown in FIG. 2, the PC 10 includes a CPU (Central Processing Unit) 11, a ROM (Read Only Memory) 12, a RAM (Random Access Memory) 13, an HDD (Hard Disk Drive) 14, a CD drive 15, an input unit 16, a display unit 17 and a network I/F (interface) 18.

The CPU 11, as a central processing unit for the centralized control of the PC 10, executes various programs (e.g. programs for the execution of processes which will be explained later referring to flow charts).

The ROM 12 is a non-rewritable memory storing various control programs to be executed by the CPU 11 and data necessary for the execution of the control programs by the CPU 11.

The RAM 13 is a memory for temporarily storing programs and data necessary for the execution of various processes by the CPU 11. An installer 131 (example of an information processing program) read out from the installer CD 151 (see FIG. 1A) is also stored in the RAM 13. By executing the installer 131, the PC 10 installs the driver 142 (for the control of the MFP 30) and a resident application 143 (explained later) in itself and executes a registration request process which will be explained later referring to FIG. 3A.

The HDD 14 stores an unshown OS (Operating System) of the PC 10, mail software 141, the driver 142, the network settings 142a and the resident application 143. An MFP registration data memory 144 (see FIG. 2) which will be explained later is reserved in the HDD 14. The mail software 141 is an application for creating and transmitting/receiving e-mails by use of mail addresses which have been set by the user.

The driver 142 is an application for controlling the MFP 30. Upon the installation of the driver 142 in the PC 10, a file describing the network settings of the MFP 30 (the file will hereinafter be referred to as "network settings of the driver 142") is created and stored in the HDD 14. The network settings of the driver 142 are changed (updated) according to changes in the network settings of the MFP 30 (details will be explained later referring to FIGS. 3A-6).

Figure 6:
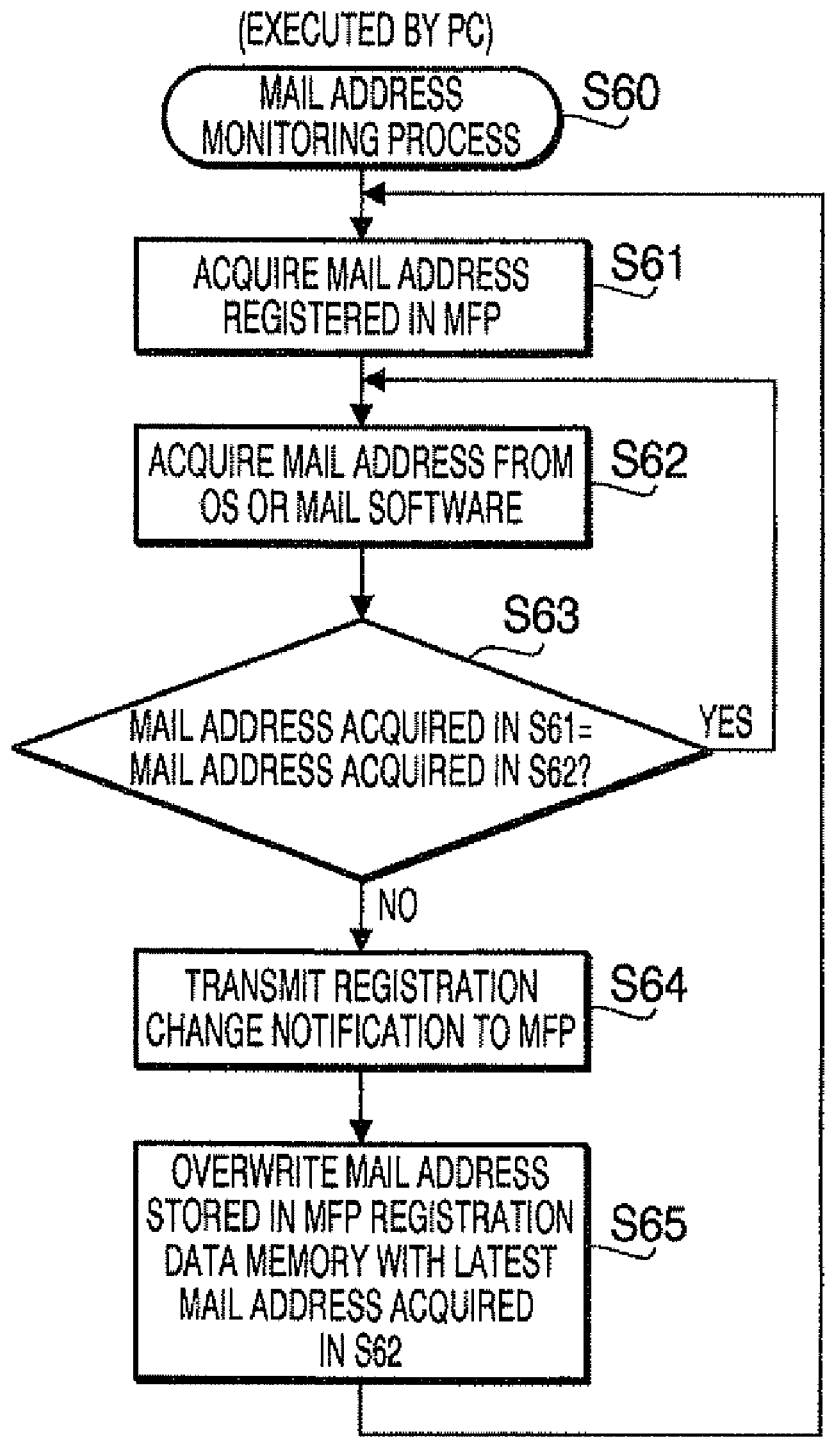
FIG. 6 is a flow chart showing a mail address monitoring process which is executed by each PC.

The resident application 143 is an application which is read out from the installer CD 151 and installed in the PC 10 together with the driver 142. A setting change process (S48)

which will be explained later referring to FIG. 4B and a mail address monitoring process (S60) which will be explained later referring to FIG. 6 are executed by the resident application 143.

The MFP registration data memory 144 is memory (storage area) for storing the mail address and/or computer name of the PC 10 upon registration of the mail address and/or computer name in the registration list 341 of the MFP 30.

The CD drive 15 reads out information from various CD media, such as the aforementioned installer CD 151 storing the installer 131, the driver 142 and the resident application 143. The input unit 16 (including a keyboard, mouse, etc.) is a unit for letting the user input data and instructions (commands) to the PC 10. The display unit 17 (CRT (Cathode-Ray Tube), LCD (Liquid Crystal Display), etc.) is a unit for displaying characters, images, etc. to let the user visually check the process currently executed by the PC 10, inputted data, etc. The network I/F 18 is a circuit for connecting the PC 10 to the LAN 50.

Meanwhile, the MFP 30 includes a CPU 31 (as a calculation unit), a ROM 32 (storing data and various control programs to be executed by the CPU 31), a RAM 33 (as memory for storing print data and control signals inputted from the PCs 10 connected to the MFP 30) and a flash memory 34 (as a rewritable non-volatile memory for storing a variety of information which has been set to the MFP 30) which are connected together by a bus line 43. The bus line 43 is connected to an I/O (Input-Output) port 42.

The flash memory 34 stores the registration list 341 (see FIG. 1A) and the network settings 342 of the MFP 30. In the registration list 341, a computer name and/or mail address specifying each PC 10 controlling the MFP 30 is registered as explained above.

The network settings 342 include the IP address and the node name which have been assigned to the MFP 30. The network settings 342 can be changed according to instructions inputted by the user through an operation panel 36 of the MFP 30 or through the PC 10, for example.

A network I/F (interface) 35 and the operation panel 36 are connected to the I/O port 42. The network I/F 35 is a circuit for connecting the MFP 30 to a network (e.g. the LAN 50). The operation panel 36 includes operation keys (unshown) and a display panel (unshown).

A scanner 38, a printer 39 and a modem 40 are also connected to the I/O port 42. By use of the scanner 38, printer 39 and modem 40, the MFP 30 is capable of executing a scanner function (in which the CPU 31 drives the scanner 38 to make it scan a document image), a printer function (in which the CPU 31 drives the printer 39 to make it execute printing on a sheet) and a facsimile communication function (in which the modem 40 modulates image data and transmits the modulated image data to a facsimile machine on the receiving side or the modem 40 demodulates modulated image data received from a facsimile machine on the transmitting side).

In the following, processes which are executed in the information processing system 1 configured as above will be described with reference to FIGS. 3A-6.

Figure 3B:
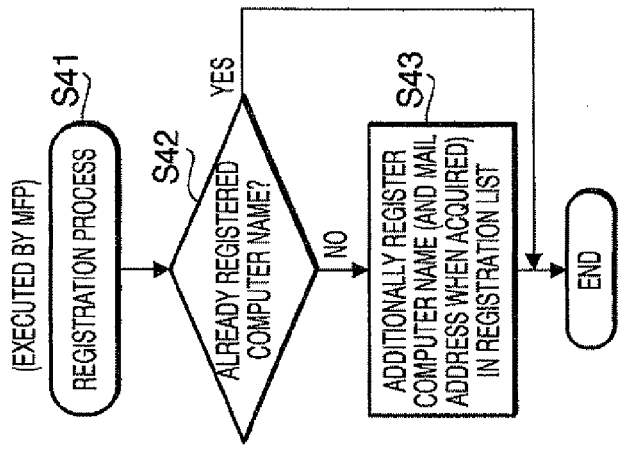
FIG. 3B is a flow chart showing a registration process which is executed by the MFP.
Figure 3A:
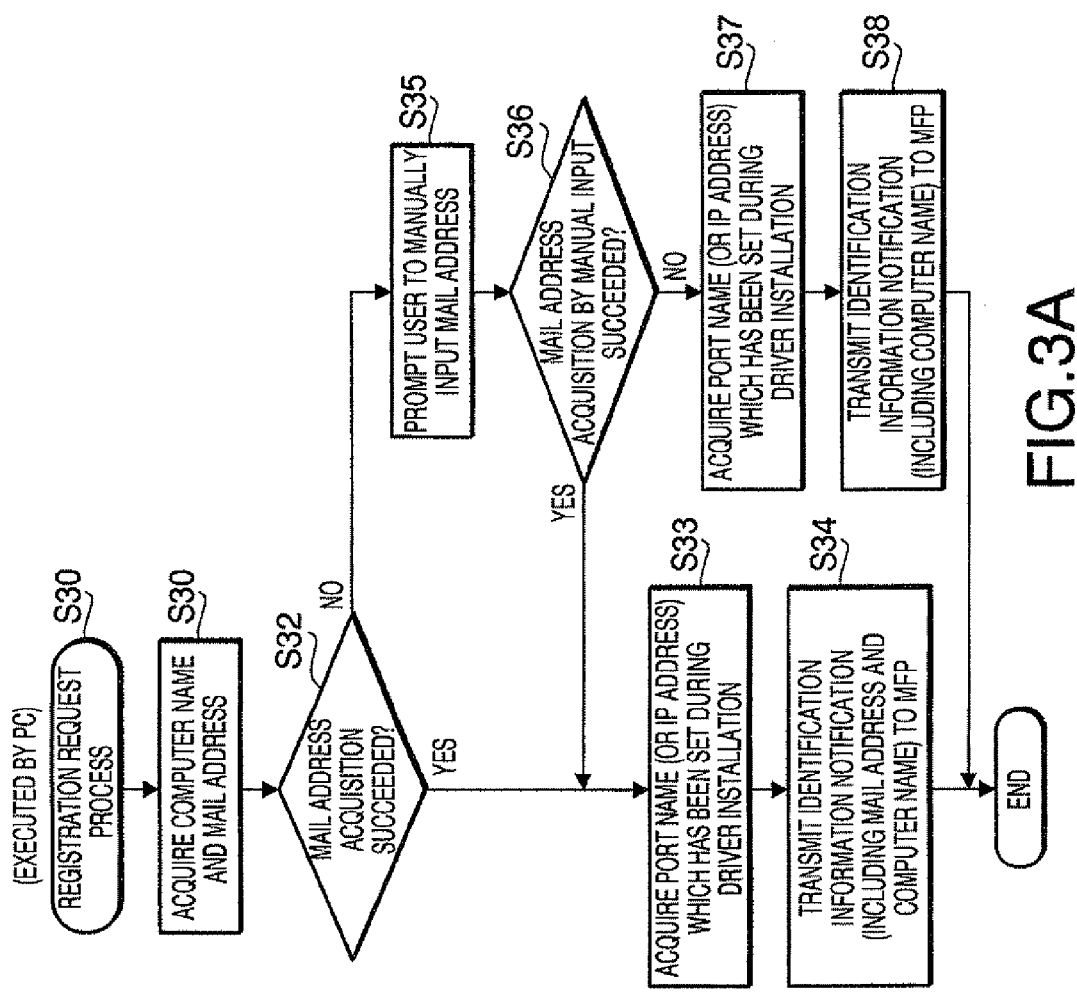
FIG. 3A is a flow chart showing a registration request process which is executed by a PC (Personal Computer) included in the information processing system.

FIG. 3A is a flow chart showing the registration request process (S30) which is executed by a PC 10. The registration request process (S30), which is started by a PC 10 upon the installation of the driver 142 (for the control of the MFP 30) in the PC 10 (see FIG. 2), is executed for registering the mail address and/or the computer name of the PC 10 in the registration list 341 (see FIG. 2) of the MFP 30.

The registration request process (S30) is carried out by the PC 10 following the installation of the driver 142 in the PC 10 from the installer CD 151 (see FIG. 1A) inserted into the CD drive 15. Incidentally, while the following explanation will be given assuming that the registration request process (FIG. 3A) is executed according to the installer 131, the registration request process may also be executed by the resident application 143 (which is installed in the PC 10 together with the driver 142), for example. Further, the registration request process may also be executed by the installer 131 after the installation of the driver 142 and before the installation of the resident application 143.

At the start of the registration request process, the PC 10 (CPU 11) acquires the mail address (example of identification information) which has been set to the mail software 141 and the computer name (example of identification information) which has been registered in the OS (unshown) of the PC 10 (S31). Incidentally, a procedure (subroutine) for acquiring the already set mail address has been prestored in the installer 131 in regard to each piece of mail software that is assumed to be generally used on the PC 10. Thus, the mail address which has been set to the mail software 141 is acquired according to the prestored acquisition procedure.

Subsequently, the PC 10 judges whether the acquisition of the mail address has succeeded or not (S32). When the mail address acquisition has succeeded (S32: YES), the PC 10 acquires a port name (or the IP address) of the MFP 30 (S33). Since the port name (or IP address) has already been set during the installation of the driver 142 (carried out prior to the registration request process (S30)), the value already set is acquired in S33.

Then, the PC 10 establishes communication with the MFP 30 by specifying the acquired port name (or IP address), generates an identification information notification which includes the mail address and the computer name acquired in S31, and transmits the identification information notification to the MFP 30 (in order to request the MFP 30 to register the mail address and computer name of the PC 10) while storing the mail address and computer name sent to the MFP 30 in the MFP registration data memory 144 (see FIG. 2) (S34).

On the other hand, the mail address acquisition in S31 can fail (i.e. the judgment of S32 can result in "NO") when the mail address acquisition procedure in regard to the mail software 141 used on the PC 10 is unknown, when the mail address to be used by the mail software 141 has not been set yet, etc.

In such a case where the mail address acquisition in S31 is judged to have failed (S32: NO), the PC 10 displays a dialog, prompting the user to manually input the mail address, on the display unit 17 (S35). When the mail address acquisition by manual input has succeeded (S36: YES), the PC 10 advances to the step S33 and then transmits the identification information notification (including the acquired mail address and the computer name acquired in S31) to the MFP 30 (S34).

On the other hand, when the mail address acquisition by manual input has failed (S36: NO), the PC 10 acquires the port name (or IP address) of the MFP 30 similarly to S33 (S37). Thereafter, the PC 10 establishes communication with the MFP 30 by specifying the acquired port name (or IP address), generates an identification information notification which includes the computer name acquired in S31, and transmits the identification information notification to the MFP 30 (in order to request the MFP 30 to register the computer name of the PC 10) while storing the computer name sent to the MFP 30 in the MFP registration data memory 144 (see FIG. 2) (S38). As above, the identification information notification is transmitted from a PC 10 to the MFP 30 upon installation of the driver 142 in the PC 10.

FIG. 3B is a flow chart showing a registration process (S41) which is executed by the MFP 30. In the registration process (which is started upon reception of the identification information notification from a PC 10), the computer name and/or mail address included in the received identification information notification is registered in the registration list 341.

At the start of the registration process (S41), the MFP 30 (CPU 31) judges whether or not the computer name included in the received identification information notification has already been registered in the registration list 341 (S42). When affirmative in S42 (S42: YES), the MFP 30 ends the registration process of FIG. 3B.

When negative in S42 (S42: NO), the MFP 30 additionally registers the computer name included in the received identification information notification in the registration list 341 (S43) and ends the registration process. When a mail address is also included in the received identification information notification in S43, the MFP 30 additionally registers the mail address in the registration list 341 while associating the mail address with the computer name (S43).

By the execution of the registration request process (S30) which has been explained referring to FIG. 3A and the registration process (S41) which has been explained referring to FIG. 3B, the computer name (and the mail address when acquired successfully) of each PC 10 in which the driver 142 has been installed (i.e. each PC 10 capable of controlling the MFP 30) is automatically registered in the registration list 341 of the MFP 30.

FIG. 4A is a flow chart showing a setting change notification process (S44) which is executed by the MFP 30. In the setting change notification process (which is started upon a change in the network settings 342 assigned to the MFP 30), the setting change program 51 (to be used for incorporating the change (in the network settings 342 of the MFP 30) into the network settings 142a of the driver 142 of each PC 10) is generated and sent to each PC 10.

First, the MFP 30 (CPU 31) generates the setting change program 51 (see FIG. 1B) (S45). The setting change program 51 is a program to be used by each PC 10 for incorporating the change (in the network settings 342 of the MFP 30) into the network settings 142a of the driver 142 stored in the PC 10.

Subsequently, the MFP 30 attaches the generated setting change program 51 to an e-mail 52 and transmits the e-mail 52 to each mail address registered in the registration list 341 (S46). Thus, the setting change program 51 is sent to all PCs 10 whose mail address has been registered in the registration list 341.

Thereafter, the MFP 30 transmits a setting change notification to each PC 10 whose mail address has not been registered in the registration list 341 (i.e. each PC 10 for which only the computer name has been registered) by specifying the computer name (S47) and ends the setting change notification process of FIG. 4A. A process which is executed by each PC 10 receiving the setting change notification will be explained later referring to FIG. 4B.

When the e-mail 52 (with the setting change program 51 as the attachment) transmitted from the MFP 30 is received by a PC 10, the network administrator or the user of the PC 10 is capable of changing the network settings 142a of the driver 142 stored in the PC 10 according to the change in the network settings 342 of the MFP 30, by just running the setting change program 51 (attached to the received e-mail 52) on the PC 10.

Further, by the setting change notification process (S44), the e-mail 52 with the setting change program 51 as the attachment is transmitted to each PC 10 whose mail address has been registered in the registration list 341, by which the setting change program 51 can be delivered to the PC 10 without fail even when the PC 10 is temporarily in a state in which communication is impossible (power-off state, off-line state, etc.).

Next, the aforementioned process which is executed by each PC 10 receiving the setting change notification (setting change process) will be explained below referring to FIG. 4B.

FIG. 4B is a flow chart showing the setting change process (S48) which is executed by each PC 10 receiving the setting change notification. The setting change process (S48) is executed according to the resident application 143. The resident application 143 constantly monitors communication between the PC 10 and the MFP 30. Upon reception of the setting change notification from the MFP 30 (S49), the PC 10 (CPU 11) changes the network settings 142a of the driver 142 stored therein according to the setting change notification indicating the current network settings 342 of the MFP 30 after the change (S50).

By the setting change process (S48), the network settings 142a of the driver 142 are automatically changed (updated) even in PCs 10 whose mail address has not been registered in the registration list 341, by which the operating load on the network administrator or user for changing the network settings is reduced considerably.

Figure 5A:
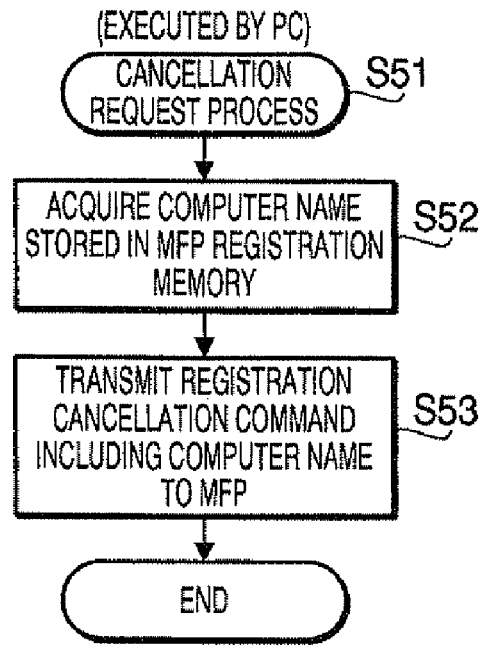
FIG. 5A is a flow chart showing a cancellation request process which is executed by a PC 10.

FIG. 5A is a flow chart showing a cancellation request process (S51) which is executed by a PC 10. In the cancellation request process (which is started in response to a driver uninstallation instruction (requesting uninstallation of the driver 142) inputted to the PC 10 by a user), the PC 10 requests cancellation of the registration of its own computer name and mail address in the registration list 341. While the cancellation request process (S51) is assumed to be executed according to the resident application 143 in the following explanation, the cancellation request process may also be executed according to a different program (e.g. uninstaller for the uninstallation).

The PC 10 (CPU 11) acquires the computer name stored in the MFP registration data memory 144 (S52), transmits a registration cancellation command including the computer name to the MFP 30 (S53), and ends the cancellation request process of FIG. 5A.

Figure 5B:
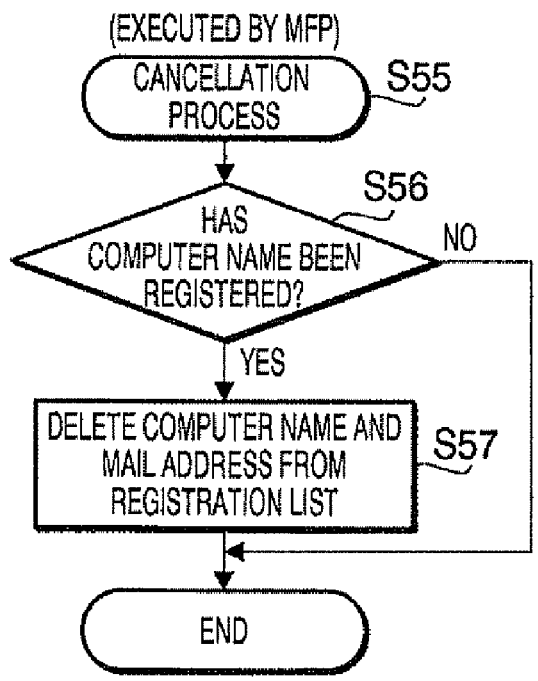
FIG. 5B is a flow chart showing a cancellation process which is executed by the MFP 30.

FIG. 5B is a flow chart showing a cancellation process (S55) which is executed by the MFP 30. In the cancellation process (which is started upon reception of the registration cancellation command from a PC 10), the MFP 30 cancels the registration of the computer name (and the mail address when it has been registered) of the PC 10.

First, the MFP 30 (CPU 31) judges whether or not the computer name included in the received registration cancellation command has already been registered in the registration list 341 (S56). When negative in S56 (S56: NO), the MFP 30 ends the cancellation process of FIG. 5B.

When affirmative in S56 (S56: YES), the MFP 30 deletes the computer name included in the registration cancellation command from the registration list 341 (S57) and ends the cancellation process. In the step S57, the MFP 30 also deletes a mail address corresponding to (associated with) the computer name from the registration list 341 when the mail address has already been registered together with the computer name.

By the cancellation request process (S51) and the cancellation process (S55) shown in FIGS. 5A and 5B, the computer name and the mail address of a PC 10 are deleted from the registration list 341 upon uninstallation of the driver 142 from the PC 10. Thus, unnecessary transmission of the setting change program 51 or the setting change notification from the MFP 30 to PCs 10 from which the driver 142 has been uninstalled (i.e. PCs 10 having extremely low possibility of communicating with the MFP 30 in the near future) can be prevented.

Incidentally, while the cancellation request process (FIG. 5A) has been explained assuming that the registration cancellation command includes the computer name only (i.e. not includes the mail address), the registration cancellation command may also include the mail address stored in the MFP registration data memory 144. In this case, the steps S56 and S57 of the cancellation process (FIG. 5B) may be configured to compare the mail address included in the registration cancellation command with each mail address already stored in the registration list 341 and then delete a mail address coinciding with the mail address included in the registration cancellation command and a computer name corresponding to the mail address from the registration list 341. The steps S56 and S57 may also be configured to delete a combination of a computer name and a mail address totally coinciding with that included in the registration cancellation command from the registration list 341 when such a combination has already been registered in the registration list 341.

FIG. 6 is a flow chart showing a mail address monitoring process (S60) which is executed by each PC 10. In the mail address monitoring process, the PC 10 monitors the mail address used by the PC 10 itself, and informs the MFP 30 of a new (changed) mail address when a change in the mail address is detected. While the mail address monitoring process (S60) in this embodiment is assumed to be executed by the resident application 143 (see FIG. 2) upon startup (turning ON) of the PC 10, the mail address monitoring process may also be executed periodically (at prescribed intervals).

First, the PC 10 (CPU 11) acquires the mail address registered in the registration list 341 (see FIG. 2) of the MFP 30, that is, the mail address stored in the MFP registration data memory 144 (see FIG. 2) (S62). Subsequently, the PC 10 acquires the mail address currently used by the PC 10 itself (S62). The mail address can be acquired from the OS or the mail software 141.

Subsequently, the PC 10 judges whether the mail address acquired in S61 is identical with that acquired in S62 (S63). When affirmative in S63, that is, when the mail address registered in the registration list 341 of the MFP 30 coincides with the mail address currently used by the PC 10 (S63: YES), the PC 10 returns to the step S62 and repeats the process from S62.

On the other hand, when negative in S63, that is, when a change in the mail address used by the PC 10 has been detected (S63: NO), the PC 10 transmits a registration change notification to the MFP 30 (S64). The registration change notification (for notifying the MFP 30 of the change in the mail address used by the PC 10 and thereby making the MFP 30 update the mail address registered in its registration list 341 to the latest mail address) includes the latest mail address acquired in the step S62.

Subsequently, the PC 10 overwrites the mail address stored in the MFP registration data memory 144 (see FIG. 2) with the latest mail address acquired in S62 (S65) and thereafter returns to the step S61.

By the mail address monitoring process (S60), a change in the mail address used by the PC 10 is detected and the change (latest mail address) is reported to the MFP 30. While detailed explanation is omitted here, the MFP 30 receiving the registration change notification updates the (old) mail address registered in the registration list 341 to the latest mail address included in the received registration change notification. Consequently, the setting change program 51 from the MFP 30 can be delivered without fail even to PCs 10 in which the mail address being used has changed since the installation of the driver 142.

Embodiment 2

Figure 7:
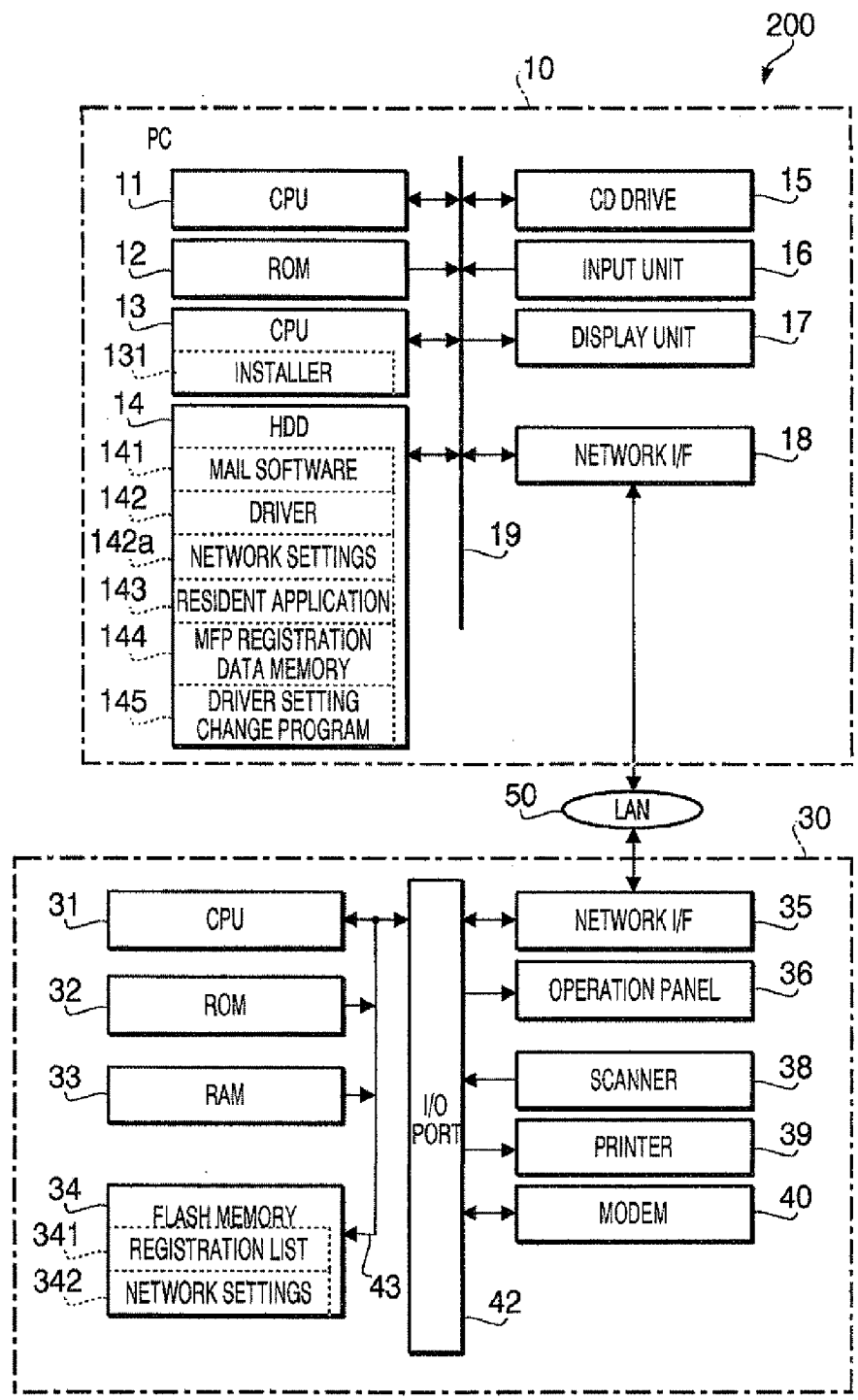
FIG. 7 is a schematic block diagram (corresponding to FIG. 2) showing the electrical configuration of an information processing system in accordance with a second embodiment of the present invention.

FIG. 7 is a schematic block diagram (corresponding to FIG. 2) showing the electrical configuration of an information processing system 200 in accordance with a second embodiment of the present invention, wherein reference characters identical or similar to those used in the first embodiment represent elements identical or equivalent to those in the first embodiment (repeated explanation thereof will be omitted).

As shown in FIG. 7, the information processing system 200 of the second embodiment differs from the information processing system 1 of the first embodiment (FIG. 2) in that a driver setting change program 145 is stored in the HDD 14 of each PC 10.

Further, while the setting change program 51 (see FIG. 1B) to be used for incorporating a change in the network settings of the MFP 30 into the network settings of the driver 142 of each PC 10 is sent from the MFP 30 to each PC 10 as the attachment to the e-mail 52 in the information processing system 1 of the first embodiment (FIGS. 1A-6), the MFP 30 in the information processing system 200 of the second embodiment generates not the setting change program 51 but a setting change file (to be loaded into the aforementioned driver setting change program 145 stored in the HDD 14 of each PC 10) and sends the setting change file to each PC 10 as an attachment to an e-mail.

Figure 8:
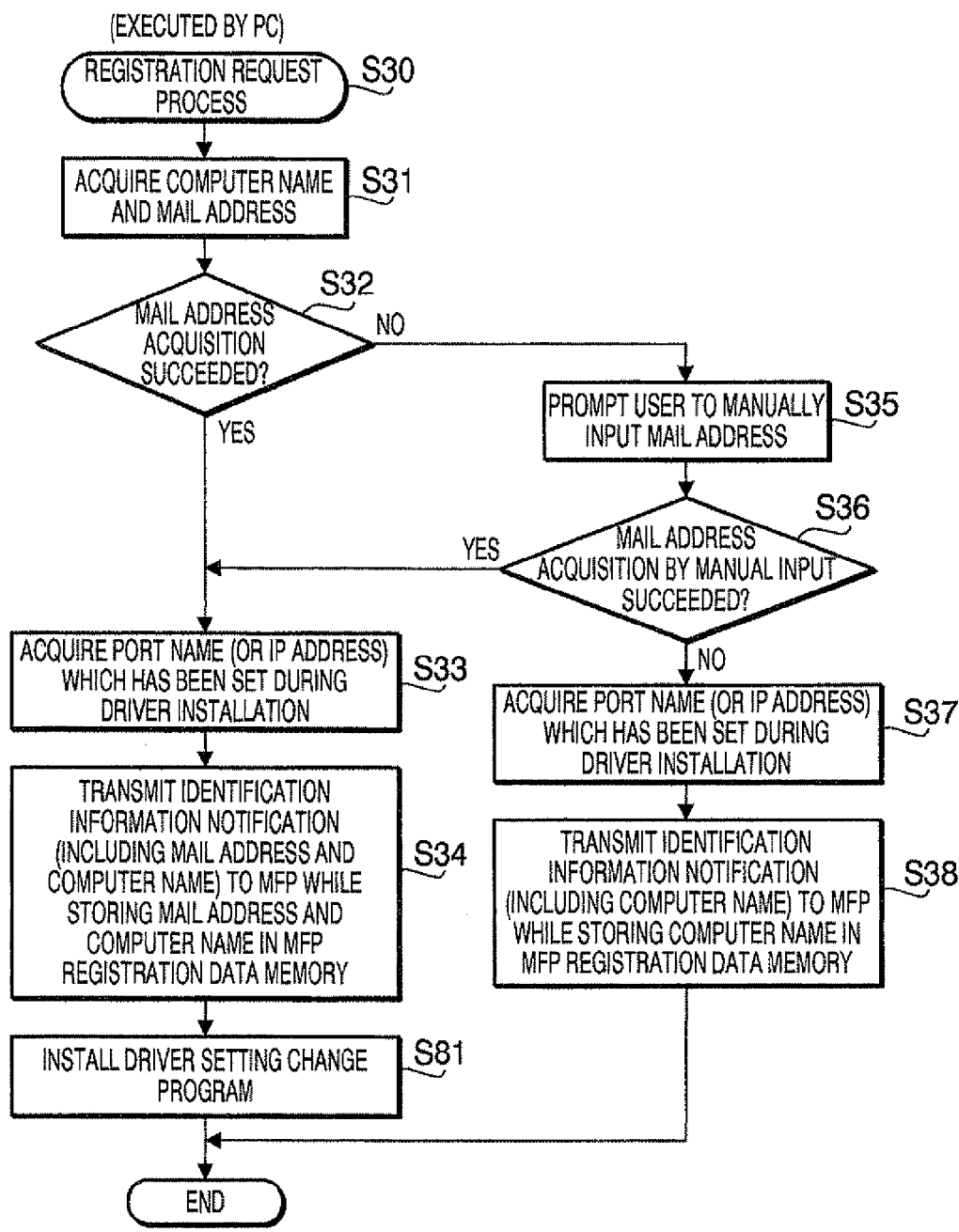
FIG. 8 is a flow chart (corresponding to FIG. 3A) showing a registration request process in accordance with a second embodiment of the present invention.

FIG. 8 is a flow chart (replacing FIG. 3A in the first embodiment) showing a registration request process (S30) in the second embodiment which is executed by a PC 10. The registration request process in the second embodiment (FIG. 8) slightly differs from that in the first embodiment (FIG. 3A) in that a new step S81 for installing the driver setting change program 145 in the PC 10 is executed after the step S34 (transmission of the identification information notification including the computer name and the mail address of the PC 10 to the MFP 30). The other steps in FIG. 8 are identical with those in the first embodiment (FIG. 3A). It is assumed in this explanation that the driver setting change program 145 to be installed in the PC 10 in S81 has been stored in the installer CD 151 together with the driver 142, etc.

As above, by the registration request process (S30) in the second embodiment (FIG. 8), the driver setting change program 145 is installed in a PC 10 upon registration of the mail address of the PC 10 in the MFP 30.

Figure 9:
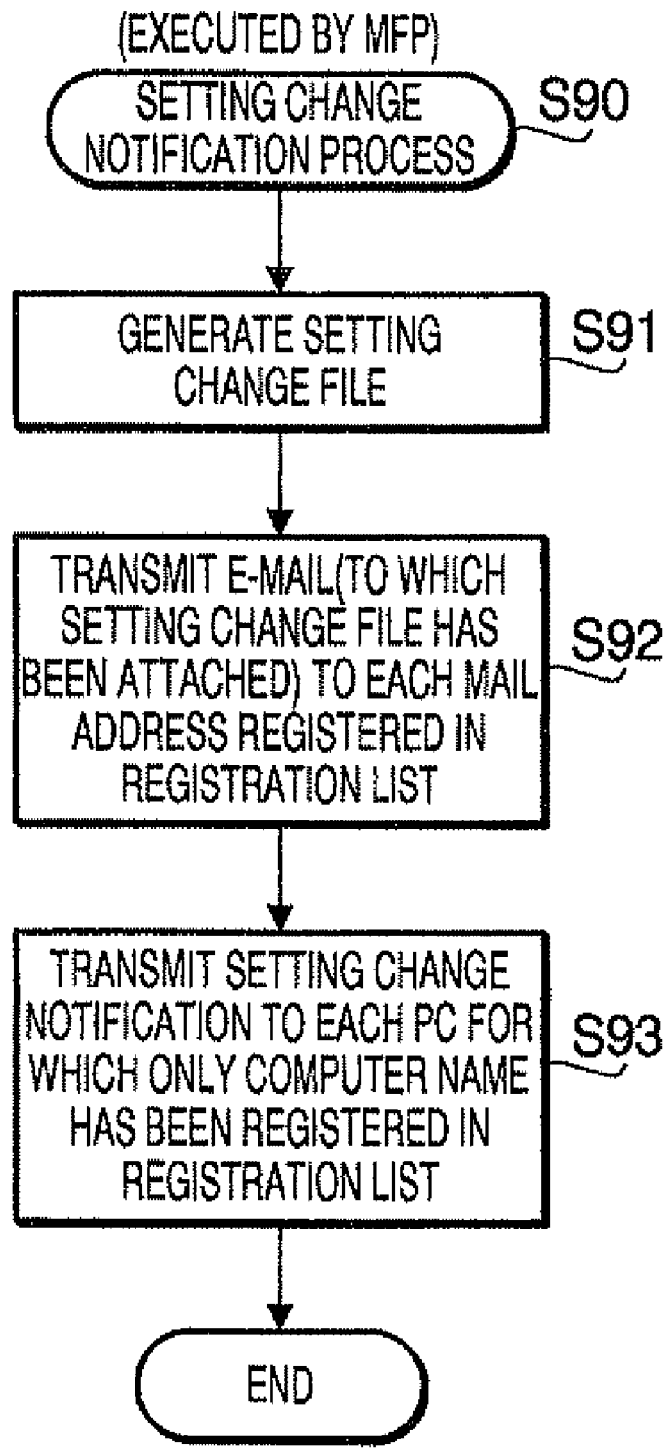
FIG. 9 is a flow chart (corresponding to FIG. 4A) showing a setting change notification process in accordance with the second embodiment.

FIG. 9 is a flow chart (replacing FIG. 4A in the first embodiment) showing a setting change notification process (S90) in the second embodiment which is executed by the MFP 30. Similarly to the setting change notification process (S44) in the first embodiment (FIG. 4A), the setting change notification process (S90) in the second embodiment (FIG. 9) is carried out upon a change in the network settings 342 assigned to the MFP 30, in order to incorporate the change (in the network settings 342 of the MFP 30) into each PC 10.

First, the MFP 30 (CPU 31) generates the setting change file (S91) The setting change file is a file to be used by each PC 10 for incorporating the change (in the network settings 342 of the MFP 30) into the network settings 142a of the driver 142 stored in the PC 10.

Subsequently, the MFP 30 attaches the generated setting change file to an e-mail and transmits the e-mail to each mail address registered in the registration list 341 (S92), by which the setting change file is sent to all PCs 10 whose mail address has been registered in the registration list 341.

Thereafter, the MFP 30 transmits the setting change notification to each PC 10 whose mail address has not been registered in the registration list 341 (i.e. each PC 10 for which only the computer name has been registered) by specifying the computer name (S93) and ends the setting change notification process of FIG. 9.

When the e-mail (with the setting change file as the attachment) transmitted from the MFP 30 is received by a PC 10, the network administrator or the user of the PC 10 is capable of changing the network settings 142a of the driver 142 stored in the PC 10 according to the change in the network settings 342 of the MFP 30, by just loading the setting change file (attached to the received e-mail) into the driver setting change program 145. Incidentally, the setting change process which is executed by each PC 10 receiving the setting change notification is identical with the setting change process (S48) in the first embodiment (FIG. 4B), and thus repeated explanation thereof is omitted here.

By the setting change notification process (S90), data for the setting change (i.e. the setting change file in the second embodiment) can be delivered to each PC 10 (whose mail address has been registered in the registration list 341) without fail even when the PC 10 is temporarily in a state in which communication is impossible (power-off state, off-line state, etc.) similarly to the setting change notification process (S44) in the first embodiment (FIG. 4A).

Furthermore, since the setting change file (which is not a program but just information to be loaded in a program) is hardly blocked by the security function of the mail software 141 or antivirus software, the setting change file can be received by each PC 10 without fail.

Embodiment 3

Figure 10:
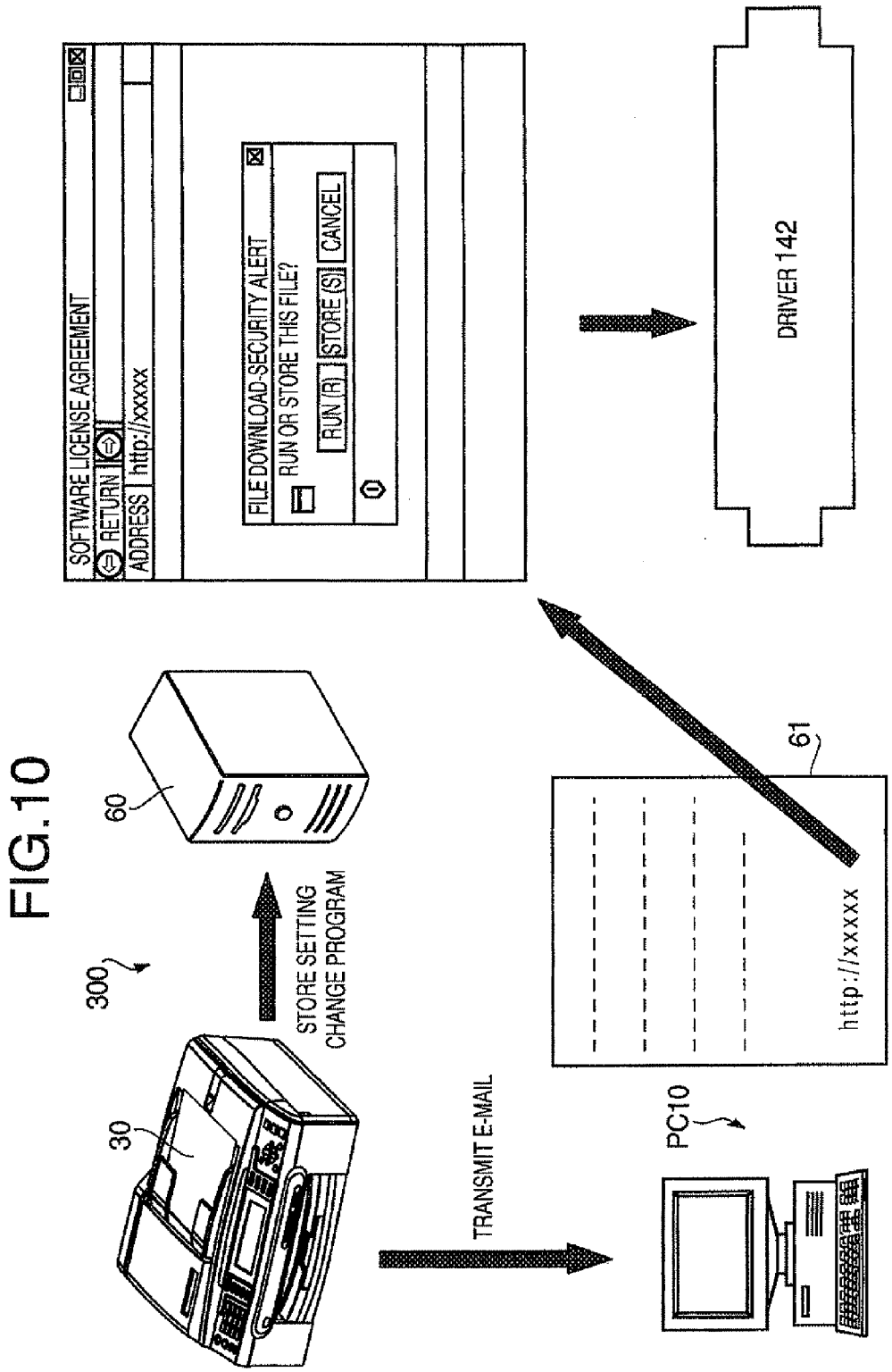
FIG. 10 is a schematic block diagram showing a process flow in an information processing system in accordance with a third embodiment of the present invention.

FIG. 10 is a schematic block diagram showing a process flow in an information processing system 300 in accordance with a third embodiment of the present invention. In the information processing system 300, the setting change program 51 (see FIG. 1B) is generated upon a change in the network settings 342 assigned to the MFP 30 similarly to the information processing system 1 of the first embodiment.

While the setting change program 51 generated by the MFP 30 is sent to each PC 10 as the attachment to the e-mail 52 in the information processing system 1 of the first embodiment, the MFP 30 in the information processing system 300 of this embodiment stores the generated setting change program 51 in a storage unit 60, describes a URL (example of access information) to be used for accessing the setting change program 51 stored in the storage unit 60 in an e-mail 61, and transmits the e-mail 61 to each PC 10 as shown in FIG. 10. Incidentally, while the storage unit 60 is assumed in this embodiment to be a Web server accessible from the MFP 30 and the PCs 10 via the Internet, the storage unit 60 can be any type of storage unit (e.g. storage unit installed in the MFP 30) as long as it is accessible from the MFP 30 and the PCs 10.

As shown in FIG. 10, the setting change program 51 stored in the storage unit 60 can be accessed from the PC 10 receiving the e-mail 61, by use of the URL described in the e-mail 61. The network administrator or the user of the PC 10 is capable of changing the network settings 142a of the driver 142 stored in the PC 10 according to the change in the network settings 342 of the MFP 30, by just downloading the setting change program 51 and running it on the PC 10.

In the information processing system 300 of the third embodiment, the e-mail 61 describing the URL (which is not a program) is hardly blocked by the security function of the mail software 141 or antivirus software and can be received by each PC 10 without fail. The mail address and/or computer name of a PC 10 is registered in the registration list 341 upon installation of the driver 142 in the PC 10 also in the information processing system 300 of the third embodiment (similarly to the first and second embodiments). Detailed explanation of the registration (equivalent to the registration request process (FIG. 3A) and the registration process (FIG. 3B) described in the first embodiment) is omitted here.

Figure 11:
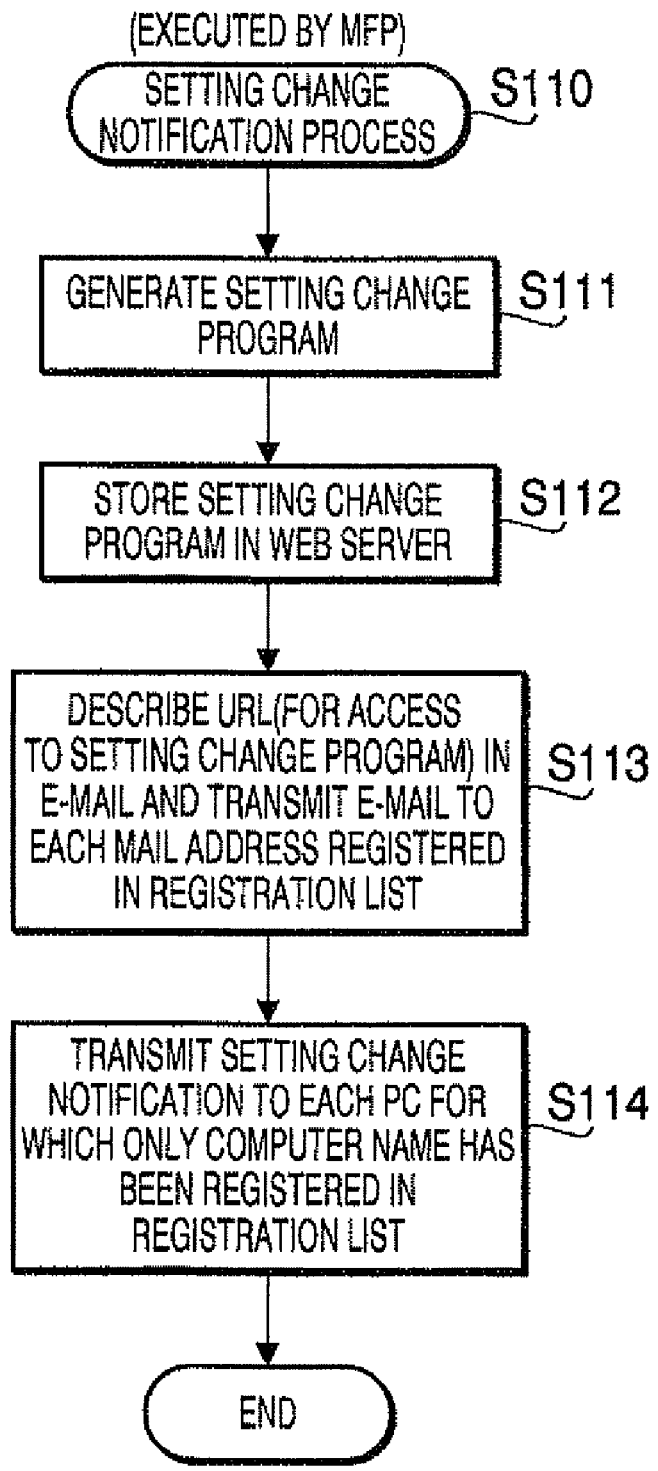
FIG. 11 is a flow chart (corresponding to FIG. 4A) showing a setting change notification process in accordance with the third embodiment.

FIG. 11 is a flow chart (corresponding to FIG. 4A) showing a setting change notification process (S110) in the third embodiment which is executed by the MFP 30. Similarly to the setting change notification process (S44) in the first embodiment (FIG. 4A), the setting change notification process (S110) in the third embodiment (FIG. 11) is carried out upon a change in the network settings 342 assigned to the MFP 30, in order to incorporate the change (in the network settings 342 of the MFP 30) into each PC 10.

First, the MFP 30 (CPU 31) generates the setting change program 51 (S111) and stores the generated setting change program 51 in the Web server (storage unit 60) (S112). Subsequently, the MFP 30 describes the URL (to be used for accessing the setting change program 51) in the e-mail 61 and transmits the e-mail 61 to each mail address registered in the Thereafter, the MFP 30 transmits the setting change notification to each PC 10 whose mail address has not been registered in the registration list 341 (i.e. each PC 10 for which only the computer name has been registered) by specifying the computer name (S114) and ends the setting change notification process of FIG. 11. Incidentally, the setting change process which is executed by each PC 10 receiving the setting change notification is identical with the setting change process (S48) in the first embodiment (FIG. 4B), and thus repeated explanation thereof is omitted here.

By the setting change notification process (S110), data for the setting change (i.e. the URL for the access to the setting change program 51 in the third embodiment) can be delivered to each PC 10 (whose mail address has been registered in the registration list 341) without fail even when the PC 10 is temporarily in a state in which communication is impossible (power-off state, off-line state, etc.) similarly to the setting change notification processes (S44, S90) in the first and second embodiments.

In the information processing system 300 of the third embodiment, the MFP 30 may also be configured to generate the setting change file (similarly to the second embodiment), store the generated setting change file in the storage unit 60, and describe a URL to be used for accessing the setting change file stored in the storage unit 60 in an e-mail which is transmitted to each PC 10.

In the information processing systems 200 and 300 of the second and third embodiments, the cancellation request process (S51), the cancellation process (S55) and the mail address monitoring process (S60) may be carried out in the same way as those in the information processing system 1 of the first embodiment.

While a description has been given above of preferred embodiments in accordance with the present invention, the present invention is not to be restricted by the particular illustrative embodiments and a variety of modifications, design changes, etc. are possible without departing from the scope and spirit of the present invention described in the appended claims.

For example, while the setting change notification process in the first through third embodiments (FIG. 4A, FIG. 9, FIG. 11) has been assumed to be executed by the MFP 30, the setting change notification process may also be executed by a PC 10 in the information processing system. In other words, a change in the network settings 342 of the MFP 30 may be reported from one PC 10 to the other PCs 10 as described below.

Figure 12:
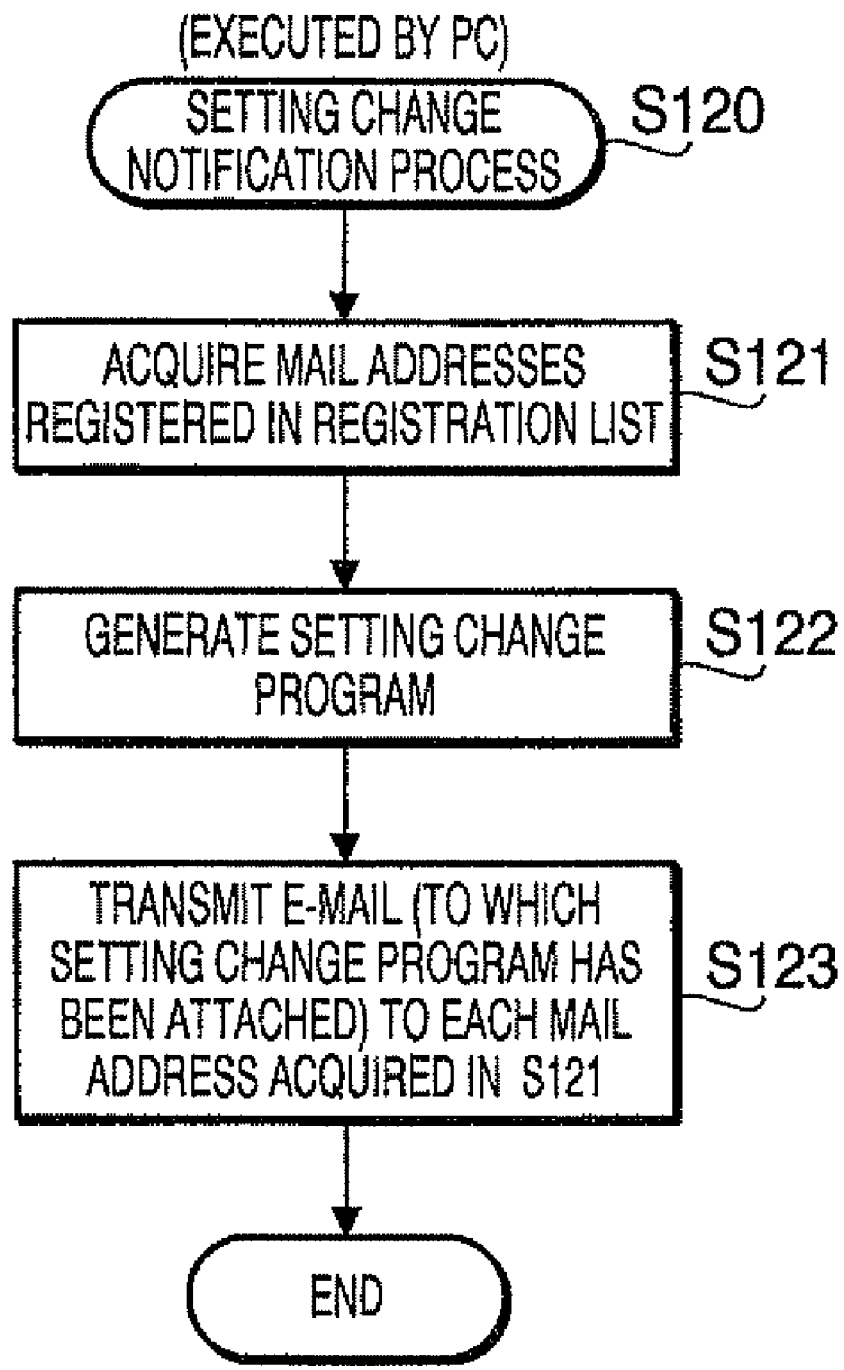
FIG. 12 is a flow chart showing a setting change notification process as a first modification.

FIG. 12 is a flow chart showing a setting change notification process (S120) as a first modification. The setting change notification process (S120) as the first modification is executed by a PC 10 instead of the setting change notification process (S44) in the first embodiment (FIG. 4A).

In the first modification, when the network settings 342 of the MFP 30 have been changed, the MFP 30 notifies a PC 10 of the setting change event (the network settings 342 after the change). Upon receiving the setting change event from the MFP 30, the OS of the PC 10 activates a setting change notification application (unshown) previously installed in the PC 10. According to the setting change notification application, the PC 10 executes the setting change notification process (S120) as the first modification (FIG. 12).

In the setting change notification process (S120), the PC 10 (CPU 11) acquires the mail addresses registered in the registration list 341 of the MFP 30 (S121), generates the setting change program 51 (see FIG. 1B) (S122), attaches the generated setting change program 51 to an e-mail, and transmits the e-mail to each of the mail addresses acquired in S121 (S123).

In the above first modification (S120), the setting change notification application is activated in a PC 10 in response to the setting change event from the MFP 30, and the generation and the transmission of the setting change program 51 are carried out by the PC 10 in place of the MFP 30, by which the processing load on the MFP 30 can be reduced considerably while achieving effects similar to those of the first embodiment. Incidentally, while the transmission of the setting change notification is not included in the above setting change notification process (S120) as the first modification (FIG. 12), the PC 10 executing the process (S120) may also transmit the setting change notification to each PC 10 whose mail address has not been registered in the registration list 341 (i.e. each PC 10 for which only the computer name has been registered) by specifying the computer name, similarly to S47 in FIG. 4A.

Next, a second modification will be described. In the setting change notification process in the first through third embodiments (FIG. 4A, FIG. 9, FIG. 11), the e-mail is transmitted to each PC 10 whose mail address has been registered (irrespective of whether the PC 10 is in connection with the LAN 50 or not) while transmitting the setting change notification to the other PCs 10. However, the method/contents of the communication may be changed depending on whether each PC 10 is in connection with the LAN 50 or not as described below.

FIG. 13A is a flow chart showing a setting change notification process (S130) as the second modification. The setting change notification process (S130) is executed by the MFP 30 instead of the setting change notification process (S44) shown in FIG. 4A. In the setting change notification process (S130) shown in FIG. 13A, step numbers identical with those in the setting change notification process (S44) in the first embodiment (FIG. 4A) represent steps identical with those in the first embodiment, and thus repeated explanation thereof will be omitted.

In the setting change notification process (S130), the MFP 30 first finds PCs 10 that are in connection with the LAN 50 (S131). Subsequently, the MFP 30 transmits the setting change notification to PCs 10 (whose computer name and/or mail address has been registered in the registration list 341) that are in connection with the LAN 50, by specifying the computer name (S132).

Thereafter, the MFP 30 generates the setting change program 51 (see FIG. 1B) (S45) and transmits the e-mail 52 with the setting change program 51 as the attachment (S46) similarly to S46 in the setting change notification process (S44) explained referring to FIG. 4A, and ends the setting change notification process of FIG. 13A.

By the setting change notification process (S130) as the second modification, effects similar to those of the setting change notification process (S44) in the first embodiment (FIG. 4A) can be achieved. Further, the update of the network settings 142*a* of the driver 142 is made automatically in all PCs 10 (whose computer name and/or mail address has been registered in the registration list 341) in connection with the LAN 50, by which the operating load on the network administrator or user for changing the network settings can be reduced further.

Incidentally, the setting change notification process (S120) as the first modification (FIG. 12) and the setting change notification process (S130) as the second modification (FIG. 13A) can be applied to the information processing system 200 of the second embodiment, by making the sender of the e-mail (PC 10 in the first modification, MFP 30 in the second modification) generate the setting change file and attach it to the e-mail (instead of generating the setting change program 51 and attaching it to the e-mail). Similarly, the setting change notification processes (S120, S130) as the first and second modifications (FIG. 12, FIG. 13A) can also be applied to the information processing system 300 of the third embodiment, by making the sender of the e-mail (PC 10 in the first modification, MFP 30 in the second modification) store the setting change program 51 or the setting change file in the storage unit 60 and describe a URL for the access to the setting change program 51 or the setting change file in the e-mail (instead of generating the setting change program 51 and attaching it to the e-mail).

Next, a third modification will be described. In the first embodiment, the setting change notification transmitted from the MFP 30 to each PC 10 is received by the resident application 143 of the PC 10 and the network settings 142*a* of the driver 142 are changed (updated) by the resident application 143. However, the setting change notification may also be received by the OS installed in each PC 10 as described below.

FIG. 13B is a flow chart showing a setting change process (S135) as the third modification. The setting change process (S135) is executed instead of the setting change process (S48) which has been explained referring to FIG. 4B. When the setting change notification transmitted from the MFP 30 is received by the OS of a PC 10, the network settings 142*a* of the driver 142 stored in the PC 10 are changed according to the network settings 342 of the MFP 30 (after being changed) included in the setting change notification.

Incidentally, the execution of the setting change process (S135) as the third modification is possible on the assumption that a driver setting change program for rewriting the network settings 142*a* of the driver 142 has previously been installed in the PC 10 and the correspondence relationship between the driver setting change program and each event type has been properly registered in the OS so that the driver setting change program can be activated upon reception of the setting change notification (event) by the OS.

Referring to FIG. 13B, when the setting change notification transmitted from the MFP 30 (event) is received by the OS of a PC 10, the OS activates the driver setting change program (S136). Subsequently, the driver setting change program (CPU 11) changes the network settings 142*a* of the driver 142 according to the network settings 342 of the MFP 30 (after being changed) included in the setting change notification (S137).

Also by the setting change process (S135) as the third modification, effects similar to those of the setting change process (S48) explained in the first embodiment can be achieved.

Incidentally, while the registration list 341 is placed (stored) in the MFP 30 in the above embodiments, the registration list 341 may also be stored in a storage medium that is placed outside the MFP 30 (e.g. in a PC locally connected to the MFP 30).

While the MFP 30 has been used as an example of a "device" (with which one or more network settings are associated) in the information processing system in the above embodiments, the device can be any type of device connected to a network (scanner, copier, facsimile machine, printer, hard disk drive, etc.) as long as network information (e.g. IP address) or a network setting to be used for communication (e.g. encryption key) is associated with the device.

While a change in the network settings 342 of the MFP 30 is incorporated into the network settings 142a of the driver 142 (example of an application) of each PC 10 in the above embodiments, it is also possible (in cases where multiple types of applications regarding the control of the MFP 30 have been installed in a PC 10) to configure the information processing system so that network settings of all such applications are changed according to the change in the network settings 342 of the MFP 30. For example, in cases where network settings have been stored in a PC 10 also for the resident application 143 (see FIG. 2 or FIG. 7) and the driver setting change program 145 (see FIG. 7) individually, the setting change program 51 or the setting change file may be generated so that the network settings for the resident application 143 and the driver setting change program 145 will also be changed accordingly.

Incidentally, the expression "upon installation of an application (e.g. driver 142)" in this specification can mean not only "after the completion of installation of an application" but also "during installation of an application" or "in response to input of an instruction for starting installation of an application" (ditto for the expression "upon uninstallation of the application"). Similarly, the expression "upon a change in the network settings" can mean not only "after a change in the network settings" but also "during a change in the network settings" or "in response to input of an instruction for changing the network settings".

While the installation of various programs (e.g. driver 142) in each PC 10 has been assumed to be conducted by use of installer CDs 151 in the above embodiments, the installation of a program (e.g. driver 142) in a PC 10 may be carried out by other methods, such as downloading the program to the PC 10 via the Internet.

While the installer 131, the driver 142, the resident application 143 and the driver setting change program 145 have been described as separate programs in the above embodiments, each process described in the embodiments may also be executed by a multifunctional program in which a combination of part or all of the programs (131, 142, 143, 145) has been incorporated integrally.

What is claimed is:

1. An information processing system comprising:
   a device with which an address is associated; and
   one or more information processing devices connected to the device via a network;
   wherein the device includes:
      a registration unit in which identification information, specifying each of the information processing devices that stores the address of the device and controls the device by use of the stored address, is registered;
      a change information generating unit which generates change information, to be used for incorporating a change of the address associated with the device into the address stored in each information processing device, upon a change of the address associated with the device;
      a first transmission unit which transmits the change information generated by the change information generating unit to each information processing device specified by the identification information registered in the registration unit; and
      an addition unit which additionally registers further identification information specifying a further information processing device in the registration unit upon installation of an application regarding control of the device in the further information processing device.

2. The information processing system according to claim 1, wherein:
   the identification information registered in the registration unit includes an e-mail address to be used for transmitting an e-mail to each information processing device, and
   the first transmission unit attaches the change information to an e-mail and transmits the e-mail to each e-mail address included in the identification information.

3. The information processing system according to claim 2, wherein the change information generating unit generates a program to be used for incorporating the change in the address of the device into the address stored in each information processing device as the change information.

4. The information processing system according to claim 2, wherein the change information generating unit generates information, indicating the change in the address of the device, having a function of incorporating the change into the address stored in each information processing device and being designed to be loaded into a program already installed in the information processing device, as the change information.

5. The information processing system according to claim 1, wherein the information processing device includes a cancellation request unit which requests cancellation of the registration of its own identification information in the registration unit upon uninstallation of the application regarding the control of the device from the information processing device.

6. The information processing system according to claim 1, wherein:
   the identification information registered in the registration unit includes an e-mail address to be used for transmitting an e-mail to each information processing device, and
   the information processing device includes:
      an identification information storage unit which stores the e-mail address of the information processing device registered in the registration unit; and
      a change notification unit which sends a change notification, to be used for registering a changed e-mail address in the registration unit, to a device equipped with the registration unit upon a change in the e-mail address used for e-mail reception by the information processing device to an address different from the e-mail address stored in the identification information storage unit.

7. An information processing system comprising:
a device with which an address is associated; and
one or more information processing devices connected to the device via a network;
wherein the device includes:
- a registration unit in which identification information, specifying each of the information processing devices that stores the address of the device and controls the device by use of the stored address, is registered;
- a change information generating unit which generates change information, to be used for incorporating a change of the address associated with the device into the address stored in each information processing device, upon a change of the address associated with the device;
- a storage unit which stores the change information generated by the change information generating unit;
- a second transmission unit which transmits access information, to be used for accessing the change information stored in the storage unit, to each information processing device specified by the identification information registered in the registration unit; and
- an addition unit which additionally registers further identification information specifying a further information processing device in the registration unit upon installation of an application regarding control of the device in the further information processing device.

8. The information processing system according to claim 7, wherein:
the identification information registered in the registration unit includes an e-mail address to be used for transmitting an e-mail to each information processing device, and
the second transmission unit attaches the access information to an e-mail and transmits the e-mail to each e-mail address included in the identification information.

9. The information processing system according to claim 7, wherein the information processing device includes a cancellation request unit which requests cancellation of the registration of its own identification information in the registration unit upon uninstallation of the application regarding the control of the device from the information processing device.

10. The information processing system according to claim 7, wherein:
the identification information registered in the registration unit includes an e-mail address to be used for transmitting an e-mail to each information processing device, and
the information processing device includes:
- an identification information storage unit which stores the e-mail address of the information processing device registered in the registration unit; and
- a change notification unit which sends a change notification, to be used for registering a changed e-mail address in the registration unit, to a device equipped with the registration unit upon a change in the e-mail address used for e-mail reception by the information processing device to an address different from the e-mail address stored in the identification information storage unit.

11. A non-transitory computer-readable recording medium storing computer-readable instructions that cause an information processing device, which is connected via a network to an information processing system including a device with which an address is associated, and one or more information processing devices connected to the device via the network, wherein the device includes a registration unit in which identification information specifying each of the information processing devices that stores the address of the device and controls the device by use of the stored address, is registered, a change information generating unit which generates change information to be used for incorporating a change of the address associated with the device into the address stored in each information processing device upon a change of the address associated with the device, and a first transmission unit which transmits the change information generated by the change information generating unit to each information processing device specified by the identification information registered in the registration unit, to execute an addition requesting step of requesting additional registration of further identification information specifying a further information processing device in the registration unit upon installation of an application regarding control of the device in the further information processing device.

12. A non-transitory computer-readable recording medium storing computer-readable instructions that cause an information processing device, which is connected via a network to an information processing system including a device with which an address is associated, and one or more information processing devices connected to the device via the network, wherein the device includes a registration unit in which identification information specifying each of the information processing devices that stores the address of the device and controls the device by use of the stored address, is registered, a change information generating unit which generates change information to be used for incorporating a change of the address associated with the device into the address stored in each information processing device upon a change of the address associated with the device, a storage unit which stores the change information generated by the change information generating unit, and a second transmission unit which transmits access information to be used for accessing the change information stored in the storage unit to each information processing device specified by the identification information registered in the registration unit, to execute an addition requesting step of requesting additional registration of further identification information specifying a further information processing device in the registration unit upon installation of an application regarding control of the device in the further information processing device.

13. An information processing device to be connected via a network to an information processing system including a device with which an address is associated, and one or more information processing devices connected to the device via the network, wherein the device includes a registration unit in which identification information specifying each of the information processing devices that stores the address of the device and controls the device by use of the stored address, is registered, a change information generating unit which generates change information to be used for incorporating a change of the address associated with the device into the address stored in each information processing device upon a change of the address associated with the device, and a first transmission unit which transmits the change information generated by the change information generating unit to each information processing device specified by the identification information registered in the registration unit,
wherein the information processing device comprises an addition requesting unit which requests additional registration of further identification information specifying a further information processing device in the registration unit upon installation of an application regarding control of the device in the further information processing device.

14. An information processing device to be connected via a network to an information processing system including a device with which an address is associated, and one or more information processing devices connected to the device via the network, wherein the device includes a registration unit in which identification information specifying each of the information processing devices that stores the address of the device and controls the device by use of the stored address, is registered, a change information generating unit which generates change information to be used for incorporating a change of the address associated with the device into the address stored in each information processing device upon a change of the address associated with the device, a storage unit which stores the change information generated by the change information generating unit, and a second transmission unit which transmits access information to be used for accessing the change information stored in the storage unit to each information processing device specified by the identification information registered in the registration unit, wherein the information processing device comprises an addition requesting unit which requests additional registration of further identification information specifying a further information processing device in the registration unit upon installation of an application regarding control of the device in the further information processing device.

* * * * *